United States Patent
Pruitt et al.

(10) Patent No.: US 7,308,475 B1
(45) Date of Patent: Dec. 11, 2007

(54) METHOD AND SYSTEM FOR ACCESSING NETWORK SERVICES

(75) Inventors: Joseph A. Pruitt, Duvall, WA (US);
Bryan D. Skene, Seattle, WA (US);
Patrick D. Jenny, Issaquah, WA (US);
Gary N. Mager, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 912 days.

(21) Appl. No.: 10/431,394

(22) Filed: May 6, 2003

(51) Int. Cl.
*G06F 15/16* (2006.01)

(52) U.S. Cl. .................. 709/203; 709/219; 709/223; 709/229; 718/104; 718/105

(58) Field of Classification Search .............. 709/203, 709/217, 219, 223, 227, 229, 224; 718/104–105
See application file for complete search history.

(56) References Cited

U.S. PATENT DOCUMENTS

| | | | |
|---|---|---|---|
| 6,154,777 A * | 11/2000 | Ebrahim | 709/227 |
| 6,259,405 B1 | 7/2001 | Stewart et al. | |
| 6,370,527 B1 * | 4/2002 | Singhal | 707/6 |
| 6,728,704 B2 * | 4/2004 | Mao et al. | 707/3 |
| 7,133,863 B2 * | 11/2006 | Teng et al. | 707/3 |
| 2003/0074301 A1 | 4/2003 | Solomon | |
| 2003/0105846 A1 | 6/2003 | Zhao et al. | |
| 2003/0139934 A1 | 7/2003 | Mandera | |
| 2003/0195813 A1 | 10/2003 | Pallister et al. | |
| 2003/0220835 A1 | 11/2003 | Barnes | |
| 2003/0229665 A1 | 12/2003 | Ryman | |
| 2004/0006591 A1 | 1/2004 | Matsui et al. | |
| 2004/0030627 A1 | 2/2004 | Sedukhin | |
| 2004/0030740 A1 | 2/2004 | Stelting | |
| 2004/0043758 A1 | 3/2004 | Sorvari et al. | |
| 2004/0122926 A1 * | 6/2004 | Moore et al. | 709/223 |
| 2005/0165656 A1 | 7/2005 | Frederick et al. | |
| 2005/0234928 A1 * | 10/2005 | Shkvarchuk et al. | 707/100 |

OTHER PUBLICATIONS

Dawn Kawamoto, "Amazon Files for Web Services Patent," CNET News.com, Jul. 28, 2005, pp. 1-2, http://www.news.com.
Tony Baer et al., "The elements of Web services," Application Development Trends, Dec. 1, 2002, pp. 1-6, Application Development Trends, Framingham, MA, http://www.adtmag.com.
Rich Seeley, "Can Infravio technology revive UDDI?," Application Development Trends, Oct. 22, 2003, p. 1, Application Development Trends, Framingham, MA, http://www.adtmag.com.

(Continued)

*Primary Examiner*—Ario Etienne
*Assistant Examiner*—LaShonda Jacobs
(74) *Attorney, Agent, or Firm*—Nixon Peabody LLP

(57) ABSTRACT

A method and system for accessing network services. A client sends a request for a service. The request includes an address of the client. One or more resolvers receive the request for a service. The one or more resolvers determine at least one service location to return to the client based at least partially on the service requested and the address of the client. The at least one service location is then returned to the client. The service locations returned to the client may also be based on a policy, user preferences, client preferences, or client characteristics.

9 Claims, 8 Drawing Sheets

OTHER PUBLICATIONS

Martin Lamonica, "Infravio spiffs up Web services registry idea," CNET News.com, May 11, 2004, pp. 1-2, http://www.news.com.

"3-DNS® Reference Guide version 4.5," Sep. 2002, pp. 2-1-2-28, 3-1-3-12, 5-1-5-24, F5 Networks, Inc., Seattle, Washington.

"BIG-IP® Reference Guide version 4.5", Sep. 2002, pp. 11-1-11-32, F5 Networks, Inc., Seattle, Washington.

"Routing Global Internet Users to the Appropriate Data Center and Applications Using F5's 3-DNS Controller," Aug. 2001, pp. 1-4, F5 Networks, Inc., Seattle, Washington, http://www.f5.com/f5products/3dns/relatedMaterials/3DNSRouting.html.

"Using F5's 3-DNS Controller To Provide High Availability Between Two or More Data Centers," F5 Networks, Inc., Aug. 2001, pp. 1-3, F5 Networks, Inc., Seattle, Washington, http://www.f5.com/f5products/3dns/relatedMaterials/UsingF5.html.

Brent Sleeper, "Why UDDI Will Succeed, Quietly: Two Factors Push Web Services Forward," Apr. 2001, pp. 1-7, The Stencil Group, Inc., San Francisco, California, http://www.stencilgroup.com/ideas_scope_200104uddi.pdf.

Brent Sleeper, "The Evolution of UDDI: UDDI.org White Paper," Jul. 19, 2002, pp. 1-15, The Stencil Group, Inc., San Francisco, California, http://www.uddi.org/pubs/the_evolution_of_uddi_20020719.pdf.

"UDDI Overview," Sep. 6, 2000, pp. 1-21, uddi.org, http://www.uddi.org/.

"UDDI Technical White Paper," Sep. 6, 2000, pp. 1-12, uddi.org, http://www.uddi.org/.

"UDDI Version 3.0.1 UDDI Spec Technical Committee Specification," Oct. 14, 2003, pp. 1-383, uddi.org, http://www.uddi.org/.

Yasser Shohoud, "Building XML Web Services with VB .NET and VB 6," 2002, pp. 1-14, Addison Wesley, Boston, Massachusetts.

Bill Schilit, "Bootstrapping Location-Enhanced Web Services," Dec. 4, 2003, University of Washington, Seattle, Washington, http://www.cs.washington.edu/news/colloq.info.html.

Frank Sommers, "What's New in UDDI 3.0—Part 1," Jan. 27, 2003, pp. 1-5, webServices.Org, http://www.webservices.org/index.php/articlesview/871/1/24/.

Frank Sommers, "What's New in UDDI 3.0—Part 2," Mar. 2, 2003, pp. 1-8, WebServices.Org, http://www.webservices.org/index.php/article/articleview/881/1/24.

Frank Sommers, "What's New in UDDI 3.0—Part 3," Feb. 2, 2003, pp. 1-4, WebServices.Org, http://www.webservices.org/index.php/articleview/894/1/24.

\* cited by examiner

METHOD AND SYSTEM FOR ACCESSING NETWORK SERVICES

FIELD OF THE INVENTION

This application relates generally to computer services, and more specifically to accessing network services.

BACKGROUND

Universal Description, Discovery and Integration (UDDI) provides a protocol for providing a requestor of a service location with one or more service locations. A service location is an address, text string, or data that identifies or locates a service. A service location may include one or more of a network address, e.g., an Internet Protocol (IP) address of 122.233.22.1, a domain name such as www.uspto.gov a port number, e.g., 2343, a path name such as /bookinventory/scientific, a network protocol, and an email address. One example of a service location is http://www.uspto.gov:2243/bookinventory/scientific. Another example of a service location is scientificbooks@uspto.gov. A Uniform Resource Identifier (URI) may qualify as a service location. The syntax for URIs is known in the art.

In the UDDI model, service locations are published in a UDDI registry or database. Additionally, information about the service, such as which protocols the service uses may also be placed in the UDDI registry. The Web services, data structures and behaviors of a UDDI registry are known in the art.

In the UDDI model, a client requests a location of a service from a UDDI server. The server then queries the UDDI registry to map the client request to a service location. Then, the server returns a service location to the client. Typically, the client then uses the service location to access the service.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise.

The term "or" is an inclusive "or" operator, and is equivalent to the term "and/or", unless the context clearly dictates otherwise.

The term "based on" is not exclusive and allows for being based on additional factors not described, unless the context clearly dictates otherwise.

The term "network" includes any method or medium for transmitting information from one device to another, unless the context clearly dictates otherwise. A network may interconnect devices that are relatively local to each other (sometimes referred to as a local area network), devices that are relatively spread out with respect to each other (sometimes referred to as a wide area network), or some combination thereof. A network may include wired or wireless communication links. A widely recognized network is the Internet which connects millions of devices around the world.

The term "Web service" describes specific business functionality exposed by an organization or person, usually through an Internet connection, for the purpose of providing a way for another organization, person, or software program to use the service. Web services may be used for electronic commerce. For example, one company may call another's service to send a purchase order directly via an Internet connection. Another example is a service that calculates the cost of shipping a package of a certain size or weight a specified number of miles via a specific carrier. A service can be exposed in a network other than the Internet. Throughout this document, service and Web service are used interchangeably.

Figure 1:
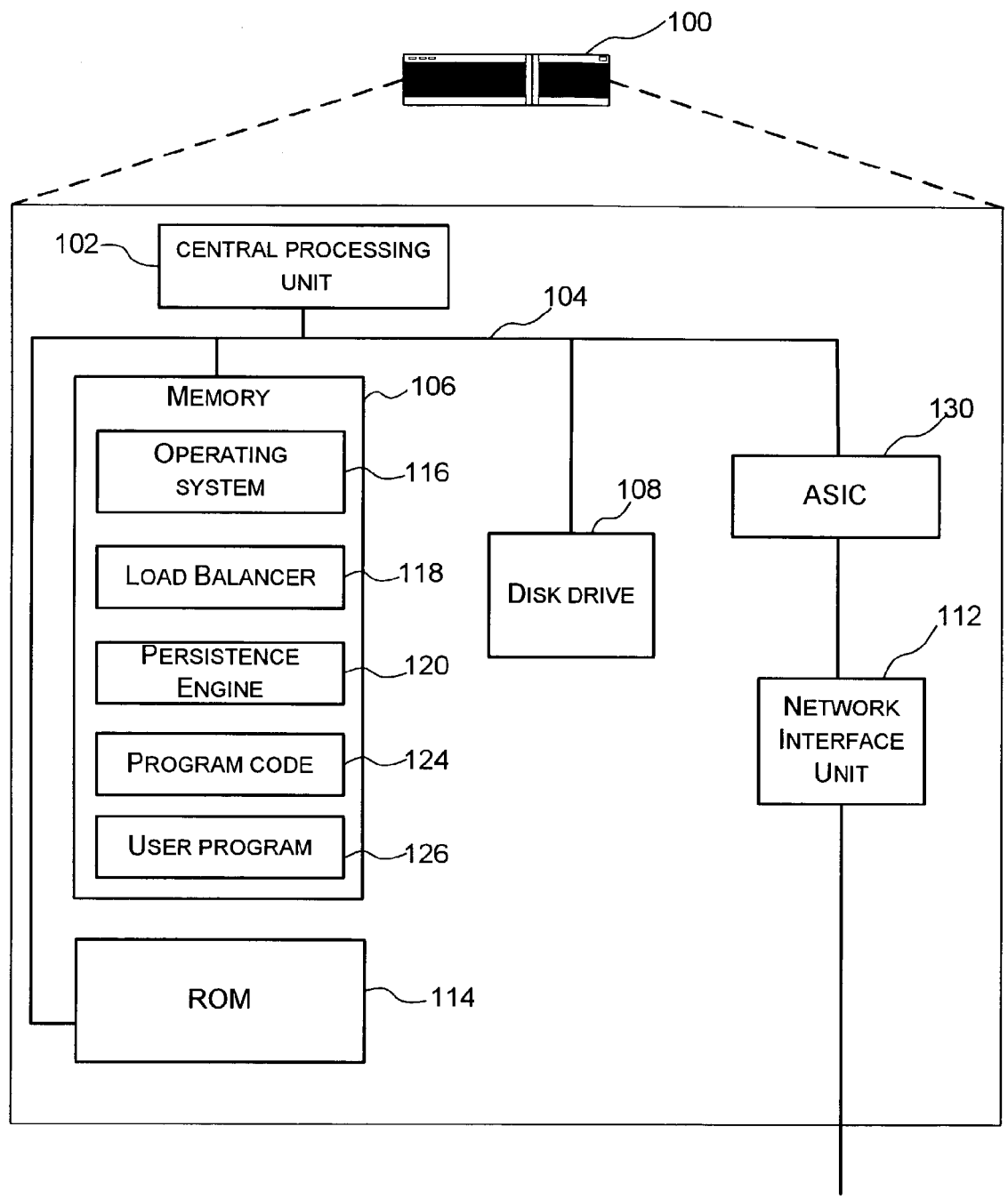
FIG. 1 is a block diagram representing an exemplary traffic manager.

FIG. 1 is a block diagram representing an exemplary network device 100 that can operate as a traffic manager in accordance with an embodiment of the present invention. It will be appreciated that not all components of network device 100 are illustrated, and that network device 100 can include more or fewer components than those shown in FIG. 1. Network device 100 can operate, for example, as a router, bridge, firewall, gateway, distributor, load balancer, traffic manager, or proxy server. It is to be noted that these functions are not necessarily distinct from each other. For example, a traffic manager may perform load balancing and control an array of servers. The communications can take place over a network.

As illustrated in FIG. 1, network device 100 includes a central processing unit (CPU) 102, mass memory, and a network interface unit 112 connected via a bus 104. Network interface unit 112 includes the necessary circuitry for connecting network device 100 to a network (not shown), and is constructed for use with various communication protocols, including the TCP/IP protocol. Network interface unit 112 can include or interface with circuitry and components for transmitting messages and data over any network, including those with a wired or wireless communication links.

The mass memory generally includes random access memory ("RAM") 106, read-only memory ("ROM") 114, and one or more permanent mass storage devices, such as hard disk drive 108. The mass memory stores operating system 116 for controlling the operation of network device 100. The operating system 116 may comprise an operating system such as UNIX®, LINUX®, or Windows®.

In one embodiment, the mass memory stores program code and data for implementing a load balancer 118, and program code and data for implementing a persistence engine 120. The mass memory can also store additional program code 124 and data for performing the functions of network device 100. The mass memory can further include one or more user programs 126 for controlling the network device 100. In particular, in accordance with one embodiment of the present invention, at least one of the user programs 126 interacts with, provides data to, receives data from, and controls the load balancer 118 and the persistence engine 120 which maintains connections between clients and servers.

In one embodiment, the network device 100 includes one or more Application Specific Integrated Circuit (ASIC) chips 130 connected to the bus 104. The ASIC chip 130 includes logic that performs some of the functions of network device 100. For example, in one embodiment, the ASIC chip 130 performs a number of packet processing functions, to process incoming packets. In one embodiment, the ASIC chip 130 includes the persistence engine 120, or a portion thereof. In one embodiment, the network device 100 includes one or more field-programmable gate arrays (FPGA) (not shown), instead of, or in addition to, the ASIC chip 130. A number of functions of the network device can be performed by the ASIC chip 130, by an FPGA, by the CPU 102 with the logic of program code stored in mass memory, or by any combination of the ASIC chip, the FPGA, and the CPU.

In one embodiment, the network device 100 includes an SSL proxy (not shown) that performs cryptographic operations. In one embodiment, the SSL proxy is a separate network device from the traffic manager. In one embodiment, a separate network device performs the functions of the persistence engine 120.

Computer storage media can include volatile and non-volatile, removable and non-removable media implemented in any method or technology for storage of information, such as computer readable instructions, data structures, program modules or other data. Examples of computer storage media include RAM 106, ROM 114, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 100 can also include an input/output interface (not shown) for communicating with external devices or users.

Network device 100 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades or devices coupled to the blade server. Network device 100 can also be implemented as a combination of blades and additional components in chassis.

When operating as a traffic manager, network device 100 typically includes one or more network interfaces and performs one or more of the operations of routing, translating, and switching packets. A traffic manager having a single network connection is also within the scope of the present invention.

In one example of the invention, network device 100 is a load-balancing traffic manager. In this example, the traffic manager includes load-balancing and control logic that can be implemented in software, hardware, or a combination of software and hardware.

The BIG-IP® Traffic Manager, by F5 Networks of Seattle, Wash., is an example of a traffic manager that can be used to perform embodiments of the invention. Various functions of the BIG-IP Traffic Manager are disclosed in the BIG-IP Reference Guide, version 4.5.

Figure 2:
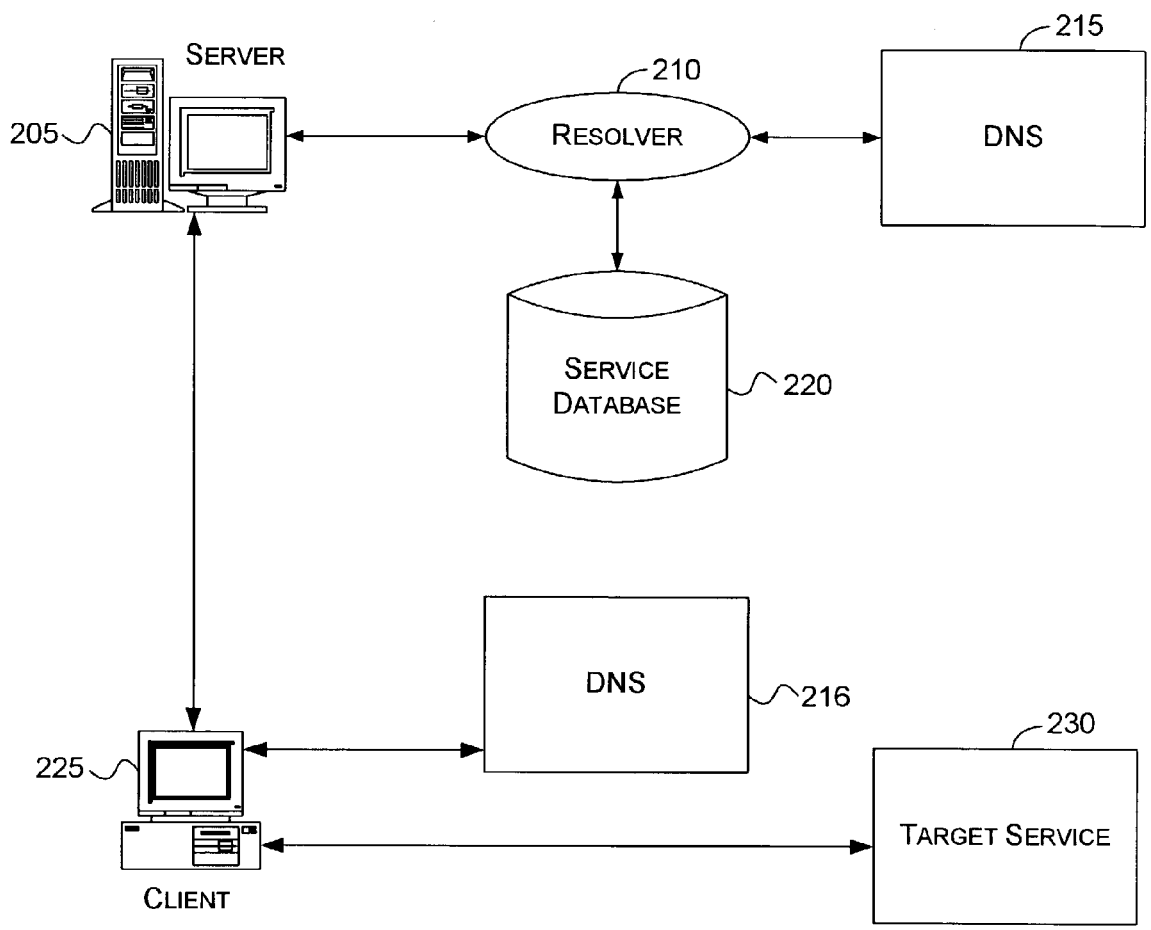
FIG. 2 is a block diagram representing an exemplary environment in which the invention may be practiced.

FIG. 2 is a block diagram representing an exemplary environment in which the invention may be practiced wherein a resolver and a server are separate entities and a client may access a local DNS to resolve domain names. The environment includes server 205, client 225, resolver 210, service database 220, two DNS servers 215-216, and target service 230.

Resolver 210 is coupled to DNS server 215, service database 220, and server 205. Client 225 is coupled to server 205, target service 230, and DNS server 216. Each coupling between two devices may be, for example, through a local area network (LAN), wide area network (WAN), telephone network, the Internet, some other network, or some combination thereof. Server 205 is a computing device that receives requests from client 225. Server 205 DNS servers 215-216, resolver 210, service database 220, and target service 230 may each be implemented on or by any device capable of executing instructions. Such devices may include, for example, computers, network appliances, multiprocessor systems, microprocessor-based or programmable consumer electronics, network PCs, cell phones, smart phones, pagers, radio frequency (RF) devices, infrared (IR) devices, CBs, personal digital assistants (PDAs), POCKET PCs, wearable computers, integrated devices combining one or more of the preceding devices, and the like. Network device 100 of FIG. 1 is one example of such a device. Unless indicated otherwise, each of the devices or processes mentioned in this disclosure may be implemented on or by any device capable of executing instructions as described above.

When receiving a request for a service location, server 205 may receive information from client 225 such as the service requested, policies, client 225's address, geography, location, priority, digital identification, preferences, security clearance, and characteristics. Client preferences may include attributes of the service or delivery of the service. These attributes might include, for example, cost of service, speed of service, quality of service (QoS), response time, freshness of data on service, reliability of service, bandwidth, and latency. Generally, client preferences are specified by the client, an application on the client, or a user utilizing the client. Client preferences may be stored on the client and transmitted when requesting a service location or they may be stored on a server. When stored on a server, a client address or ID may be used to access the client preferences. Client preferences may include a weighting assigned to each of a number of attributes.

Characteristics of client 225 include client hardware, software, network configurations, and client system capacities. Client characteristics may include, for example, client 225's operating system, brand, e.g., Compaq, Dell, etc., language, CPU, compression capabilities, bandwidth capabilities, or other characteristics of client 225. Client characteristics can also include data describing a user, organization, or other entity operating, owning, or otherwise associated with client 225. Server 205 may also receive a trace route of packets sent from client 225 that indicates a route over which the packets traveled to reach server 205.

In addition to receiving information about a client, server 205 may calculate various pieces of information about client 225 using client 225's address or digital identification. For example, server 205 may include a lookup database (not shown) that matches a client's address or identification with a particular physical location or geography. In addition, server 205 may include a policies database that includes rules that determine which service locations will be returned to a client based on one or more of a client's priority, security clearance, client preferences, and characteristics.

Policies may be established which dictate which service locations a client may be provided. In generally, a policy is a rule that applies to one or more clients. A policy is typically established by an administrator or automatically. In one embodiment, the resolver uses a policy that relates to the available capacity of a server to determine whether a client is provided a service location on the server. Available capacity can be measured with respect to CPU utilization, available memory, bandwidth, response time, or any other measure of capacity. For example, some clients requesting a service may be given service locations to servers with less than 20% CPU utilization. Based on a policy that applies to them, some clients may be referred exclusively to some servers to provide better response time, bandwidth, or otherwise. Some clients may be given service locations based on a policy that accounts for cost of service, QoS, speed, traffic, and response time. For example, a corporate client may pay to have a policy that refers the corporate client to service locations with a certain QoS, speed, traffic, and response time. It will be recognized that a policy could be applied based on an address of the client, an identification of the client, such as a digital ID, or otherwise. Furthermore, one or more policies could apply to a single client or group of clients.

Resolver 210 is a device or process that receives a set of service locations and optional client information and returns a set of service locations that are based on policy, the client information, or the received set of service locations. In the embodiment of the invention shown in FIG. 2, resolver 210 is shown as distinct from server 205. In other embodiments, resolver 210 may be integral with or implemented on server 205. Server 205 may pass information to resolver 210 including, for example, any or all of the information passed to server 205 from client 225 or determined by server 205. In addition to server 205 determining additional information about client 225 as described previously, resolver 210 may use client information sent to it, such as a client's digital ID, to determine other information about client 225. Resolver 210 may have access to a database that stores client characteristics. The client's digital ID may be used to access the client's characteristics in the database. The resolver can also receive and determine information about server 205 and use this information while resolving. For example, a client's priority or authority may be implied by information about the server.

Resolver 210 may also check the health at service locations. Resolver 210 may do this proactively by polling service locations or passively by listening for status reports from service locations. Health checks can be performed in response to receiving a request or independent of receiving a request. Health checks performed in response to receiving a request can be used to resolve subsequent requests. Resolver 210 can check the health of services at one or more service locations by calling a method on one or more servers running the services at the service locations. The method could returns various statistics, such as CPU utilization, memory usage, hard disk space available, processes active, bandwidth available, usage, etc. Resolver 210 might check the health of services at one or more service locations by calling a network device that controls access to the one or more service locations, such as a load balancer or traffic manager. The load balancer or traffic manager could then query the service locations or return health based on previous information collected. It will be recognized that health could be collected in many other ways without departing from the spirit or scope of the present invention.

After receiving information about a request and client, resolver 210 determines one or more service locations that match the client's criteria. Resolver 210 may consult service database 220 to look up the appropriate service locations. Resolver 210 may also consult DNS server 215 to resolve DNS names into addresses or to determine the health of services running at service locations. For each service location, resolver 210 may return a network address, such as 122.233.22.1, or resolver 210 may return a domain name, such as www.uspto.gov. When Server 205 returns locations containing domain names, the client 225 can use DNS server 216 or a similar network address resolution facility, to convert the string into a physical network address. It will be recognized that returning a network address may alleviate client 225 from performing its own DNS lookup (such as by consulting DNS server 216) and may give resolver 210 more control over to which network address client 225 subsequently requests a service. For example, if a domain name mapped to more than one network address, by returning a network address, instead of a domain name, resolver 210 could select a specific network address for the domain name instead of relying on another DNS server that client 225 may consult, such as DNS server 216, to determine a network address.

DNS servers 215-216 typically resolve domain names into network addresses. To do so, a DNS server that receives a domain name converts a string representing the domain name into a network address. As discussed previously, however, a DNS server, such as DNS server 215, may have extended capabilities in checking the health of servers. One such product capable of checking the health of servers is 3-DNS® produced by F5 Networks of Seattle, Wash.

Although shown separate from resolver 210, service database 220 may reside on the same device as resolver 210. Service database 220 is used to map a service location to another or the same service location. Service database 220 may comprise a UDDI registry.

Client 225 is any device or process that requests a service and uses the service. Client 225 may be implemented using, for example, one or more of the devices enumerated for server 205. In some embodiments of the invention, client 225 is a server that is requesting service locations on behalf of itself or another client. After receiving a list of service locations from server 205, typically, client 225 then selects one of the service locations from the list and accesses the service at the service location.

Figure 3:
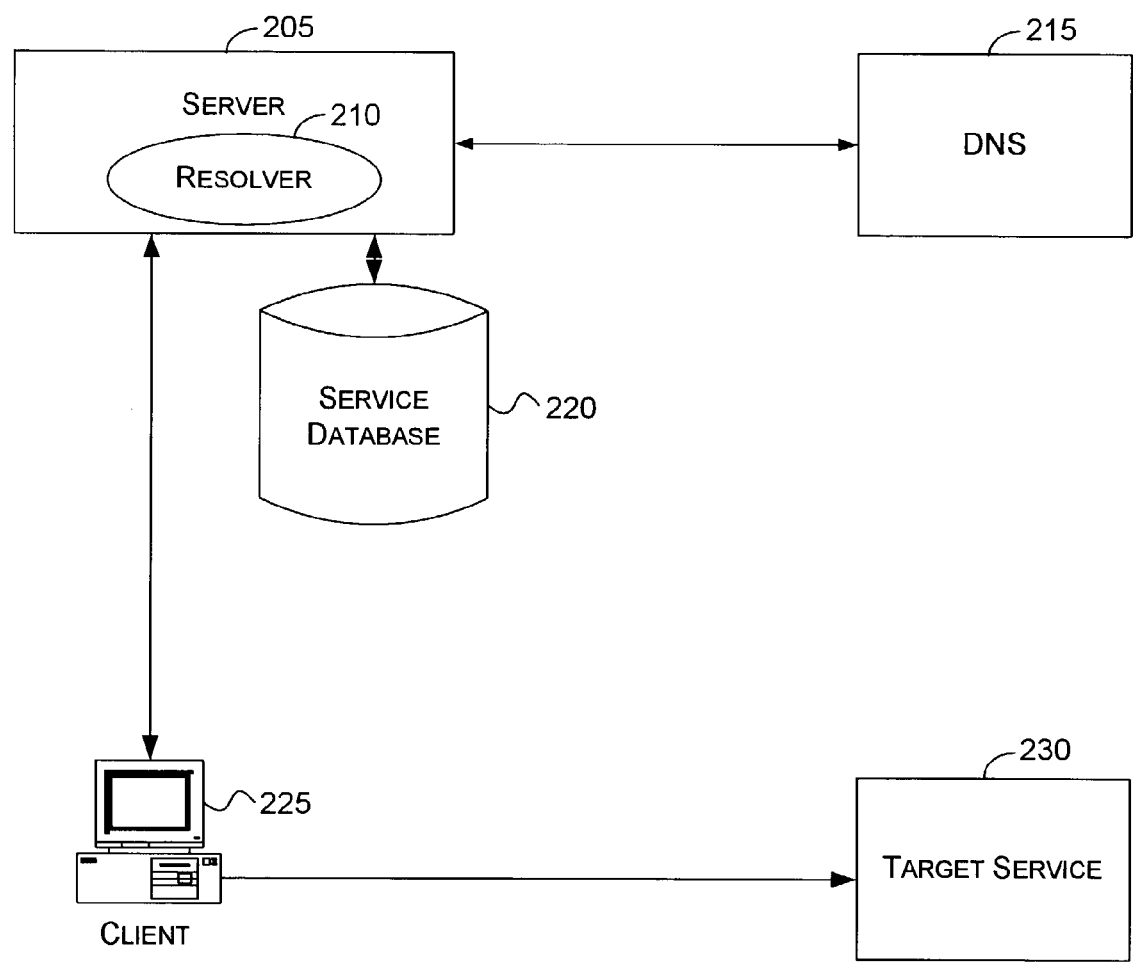
FIG. 3 is a block diagram representing an alternative exemplary environment in which the invention may be practiced.

FIG. 3 is a block diagram representing an exemplary environment in which the invention may be practiced wherein a resolver is integrated with a server and wherein the client does not have a local DNS to resolve domain names. The environment includes server 205, client 225, resolver 210, service database 220, DNS server 215, and target service 230.

Client 225 is coupled to target service 230 and server 205. Server 205 includes resolver 210 and is coupled to service database 220 and DNS server 215. Each coupling between two devices may be, for example, through a local area network (LAN), wide area network (WAN), telephone network, the Internet, some other network, or some combination thereof.

In part, FIG. 3 differs from FIG. 2 in that resolver 210 is part of server 205 and client 225 does not have a local DNS server. Logically, the systems shown in FIGS. 2 and 3 work similarly. Because client 225 does not have access to a local DNS server, resolver 210 may obtain and provide network addresses for each service location returned to client 225.

Figure 4:
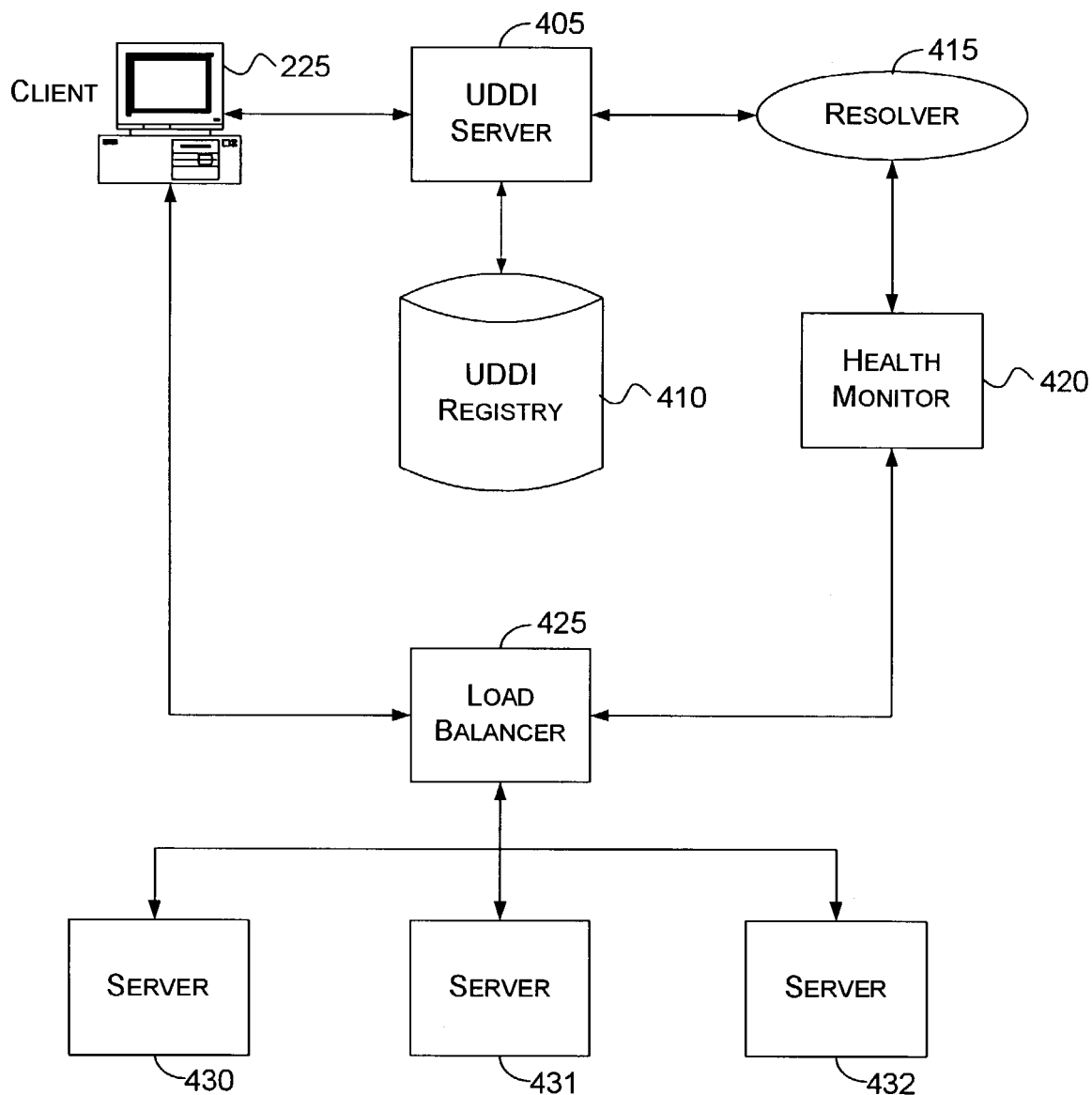
FIG. 4 is a block diagram representing another exemplary environment in which the invention may be practiced.

FIG. 4 is a block diagram representing another exemplary environment in which the invention may be practiced. As illustrated in FIG. 4, a UDDI server accesses the resolver, a load balancer load balances traffic across an array of servers, and a health monitor determines health of services at service locations. The environment includes client 225, UDDI server 405, UDDI registry 410, resolver 415, health monitor 420, load balancer 425, and three other servers 430-432.

Load balancer 425 is coupled to and provides access to servers 430-432. Load balancer 425 is also coupled to health monitor 420 and client 225. UDDI server 405 is coupled to client 225, UDDI registry 410, and resolver 415. Each coupling between two devices may be, for example, through a local area network (LAN), wide area network (WAN), telephone network, the Internet, some other network, or some combination thereof.

UDDI server 405 is a server that receives requests for service locations from client 225. UDDI server 405 receives a request for a service location and utilizes UDDI registry 410 to map the request to one or more service locations. For example, client 225 might make a request for a book publisher service. As attributes of the request, client 225 may request technical books in English or Spanish. This request is received by UDDI server 405. UDDI server 405 passes the information to UDDI registry 410 which returns one or more service locations.

Although shown separate from UDDI server 405, UDDI registry 410 is typically implemented as a part of UDDI server 405. UDDI registry 410 typically contains entries that map a request for a service location to one or more service locations. In response to a request for a service that deals with technical books in English or Spanish, UDDI registry 410 may return a list including details about qualifying services. UDDI registry 410 may, for example, return a company name, a contact, and a network address for each qualifying service.

After receiving the list of qualifying services, the UDDI server passes the list, the client's address, and any other information received from the client to resolver 415. For example, if UDDI registry 410 returned a Uniform Resource Locator (URL), e.g. http://www.scientificbooks.uspto.gov, then this URL would be passed to resolver 415 together with the other information specified above.

After receiving the list of qualifying services together with the client's address and any other information received from the client, resolver 415 determines which service location(s) are to be returned to UDDI server 405. Resolver 415 may consult health monitor 420 in determining which service location(s) are returned to UDDI server 405. When queried with a list of service locations, health monitor 420 may return a health report of each of the service locations listed. Resolver 415 may cache the health of service locations for use until an expiration time or may query health monitor 420 each time resolver 415 receives service locations from UDDI server 405. The health report returned by health monitor 420 may score each service location based on various factors such as CPU utilization, bandwidth consumed in servicing current requests, number of current requests, whether the service is up and running, or any other factors indicative of the health of the service. Resolver 415 may then use the scores for each service location together with client preferences and policies in determining which service locations to return to UDDI server 405. Resolver 415 may also return scores and rankings that correspond to the service locations to UDDI server 405.

When more than one service locations are to be returned to UDDI server 405, resolver 415 may return a list ordered by any of many characteristics, such as cost of service, QoS, speed, smallest amount of traffic, fastest response time, or any other characteristic desired or requested.

Health monitor 420 may query load balancer 425 for the health of services found on servers 430-432. In addition, or alternatively, health monitor 420 may query each of the servers individually to determine the health of services found on the servers. When resolver 415 consults health monitor 420 for the health of services at particular service locations, health monitor 420 may indicate that certain service locations are not functioning. Resolver 415 may use this information in determining which service locations to return to UDDI server 405.

In some embodiments of the invention, health monitor 420 is controlled by or integrated with resolver 415.

After receiving a list of service locations, client 225 may determine which service location to use access the service at the service location.

Load balancer 425 directs traffic to and from servers 430-432. Load balancer 425 may use any load balancing or traffic management method desired or needed to direct traffic to servers 430-432. Load balancer 425 may have facilities for checking the health of services on servers 430-432. Load balancer 425 may also have facilities for reporting the health of services on servers 430-432 to another device such as health monitor 420. An exemplary device that may be used to implement load balancer 425 is network device 100 of FIG. 1.

Servers 430-432 may be implemented by any of the devices described in conjunction with server 205 of FIG. 2. As shown in FIG. 4, servers 430-432 are arranged in a server array accessible through load balancer 425.

Although not shown in FIGS. 2 and 3, in some embodiments of the invention, health monitor 420 is included in the environments shown in FIGS. 2 and 3. As discussed previously in conjunction with FIG. 2, resolver 210 may include health checking capabilities. In another embodiment of the invention, resolver 210 of FIG. 2 consults a health monitor (not shown), such as health monitor 420, to determine the health of services. Similarly, in FIG. 3, resolver 210 may include health checking capabilities or may consult a health monitor (not shown), such as health monitor 420, to determine the health of services.

Furthermore, in some embodiments of the invention, target service 230 of FIGS. 2 and 3 executes on a server that is not accessed through a traffic manager or load balancer, such as load balancer 425 of FIG. 4. For example, target service 230 may execute on a server that is directly connected to the Internet. In other embodiments of the invention, target service 230 of FIGS. 2 and 3 executes on a server that is accessed through a traffic manager or load balancer (not shown), such as load balancer 425 of FIG. 4. For example, target service 230 may execute on a server that is accessible through a load balancer that is connected to the Internet. It will be understood that many configurations of having separate or integrated health monitors and/or traffic managers or load balancers may be implemented without departing from the spirit or scope of the invention.

Figure 5:
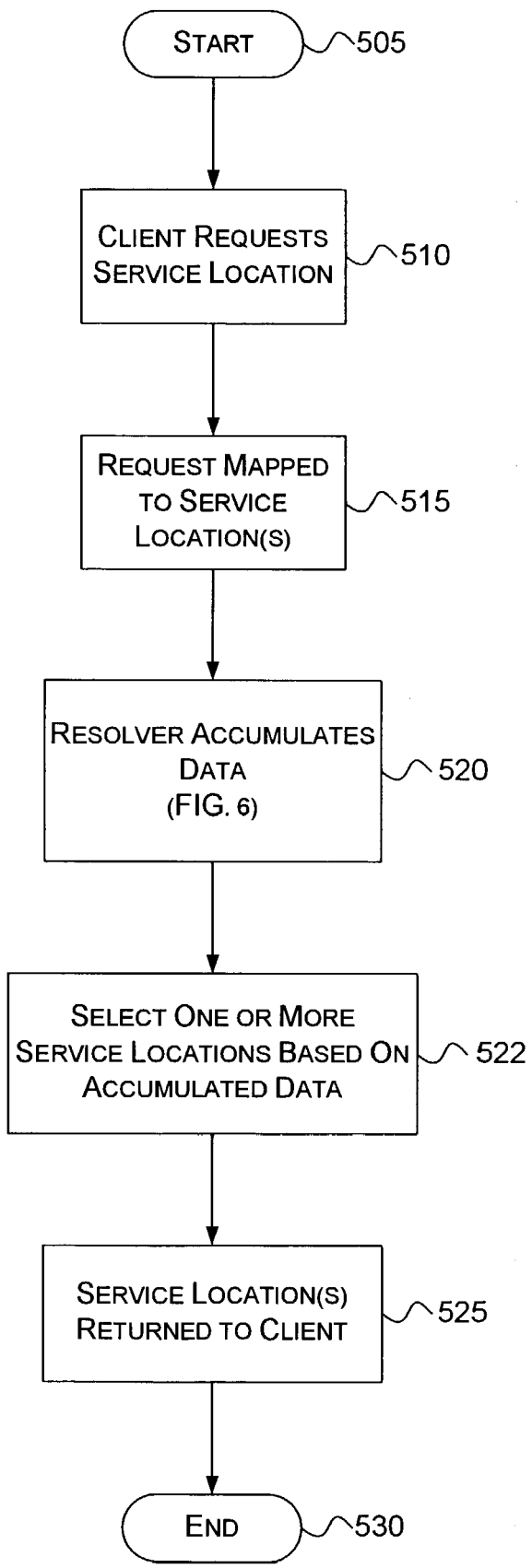
FIG. 5 is a flow diagram illustrating an exemplary process in which a request for an address of a service is mapped to one or more service locations.
Figure 6:
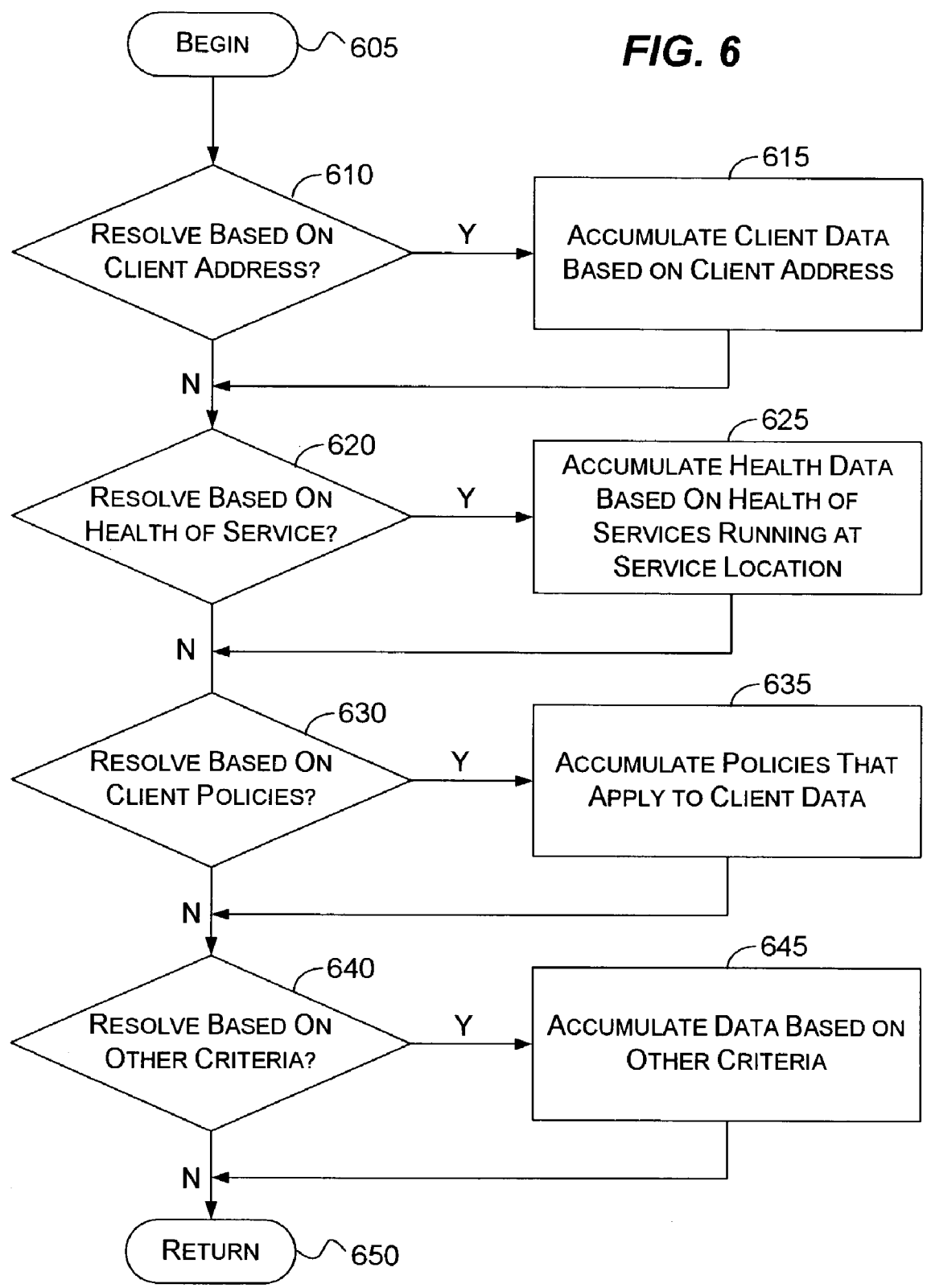
FIG. 6 is a flow diagram illustrating additional details of a process in which a request for an address of a service is mapped to one or more service locations.

FIGS. 5 and 6 are flow diagrams illustrating an exemplary process in which a request for a service location is mapped to one or more service locations. The process shown begins at block 505 when a client is ready to request a service. After block 505, processing continues at block 510.

At block 510, the client requests a service location. As discussed above, the client request can include client data, such as client address, geography, location, priority, digital identification, preferences, security clearance, policies, and client characteristics. For example, referring to FIG. 4, client 225 requests a book inventory service from UDDI server 405. Client 225 includes in its request that client 225 desires a service having scientific books in English or Japanese. After block 510, processing continues at block 515.

At block 515, request is mapped to one or more service locations. In an embodiment of the invention, referring to FIG. 4, UDDI server 405 consults UDDI registry 410 and obtains a list of service locations satisfying client 225's request. UDDI server 405 then passes this list of service locations together with other information sent by the client to resolver 415. After block 515, processing continues at block 520.

At block 520, the resolver receives the list of service locations and accumulates data in preparation of producing another list of service locations that may be the same or different from the list received, depending on the client, health of services, policies, or other criteria. As used in FIGS. 5 and 6 and herein, accumulate includes retrieve, determine, or calculate. Thus, accumulated data refers to data that has been retrieved, determined, or calculated. A process of accumulating data is described in more detail in conjunction with FIG. 6. In an embodiment of the invention, resolver 415 receives a list of service locations from a UDDI server, such as UDDI server 405. After receiving the set of service locations, resolver 415 may then accumulate data in preparation for providing another set of service locations to return to the client. In an embodiment of the invention, resolver 415 may be integrated with a UDDI server. After block 520, processing continues at block 522.

At a block 522, a score is determined for each service location, based on the accumulated data and policies. The service locations are ranked, based on their corresponding scores. A set of service locations is selected for returning to the service requestor. The determination of which service locations are selected can be based on a policy decision. For example, one policy can be to return a predetermined number of service locations. Another exemplary policy can be to return only service locations that have a corresponding score above a specified threshold value. Yet another exemplary policy can vary the number of returned service locations based on specific factors, such as reliability of the service locations, amount of network traffic, or other specified criteria.

The determination of scores corresponding to each service location can be based on any one or more of the policies employed, the accumulated data, client preferences, configured parameters, or aggregate data. For example, when responding to a request that specifies N different criteria be used in selecting locations, the following formula can be used:

$$\text{Score} = \sum_{n=1}^{N} Wn * Dn$$

where $W_n$ is a weighting factor corresponding to criteria n, and $D_n$ is a value representing the data for criteria n on a scale from 0 to 100. The maximum score using this formula is $$100 * \sum_{n=1}^{N} Wn$$

A score corresponding to a service location may be a single value (as described above) or a vector value. A vector value can include one or more criteria and values associated with the criteria. For example, criteria may include bandwidth available and CPU utilization. A score can include a vector that indicates the bandwidth available and the CPU utilization at a service location. It will be recognized that a score that includes a vector value allows for more sophisticated post-processing by an intermediate device, as an intermediate device can apply its own selection algorithm to the values included in the vector. Similarly, a requester that can receive a score may also apply its own selection algorithm to the values included in the vector. Furthermore, a requester may have preferences that is does not sent in a request. The requestor may do this for privacy reasons or because the resolver does not support the preferences. After receiving a score, the requestor may apply its own selection algorithm to the values included in the returned vector.

A requestor is any device that requests a list of service locations. A requester may request service locations for itself or on behalf of another device. A requester is not limited to a client that will later access a service executing at the service location. In one embodiment of the invention, the requestor is a client that later accesses a service executing at the service location. In other embodiments, the requester is a UDDI server, proxy server, or some other intermediate device that is capable of utilizing scores. A requestor may be capable of receiving a single valued score or a vector valued score.

The algorithm for determining scores can include additional calculations, such as threshold values for one or more criteria. For example, a specific criteria might have a threshold value, such that any service location having a data value below this threshold is given a score of zero, regardless of other criteria. After block 522, processing continues at block 525.

At block 525, a list of service locations is returned to the client. In an embodiment of the invention, referring to FIG. 4, UDDI server 405 returns a list of service locations to client 225. After block 525, processing continues at block 530.

At block 530, processing ends. At this point, the client may select a service location and access the service at the service location. The process shown in FIG. 5 may be repeated each time a client desires a service.

Figure 7:
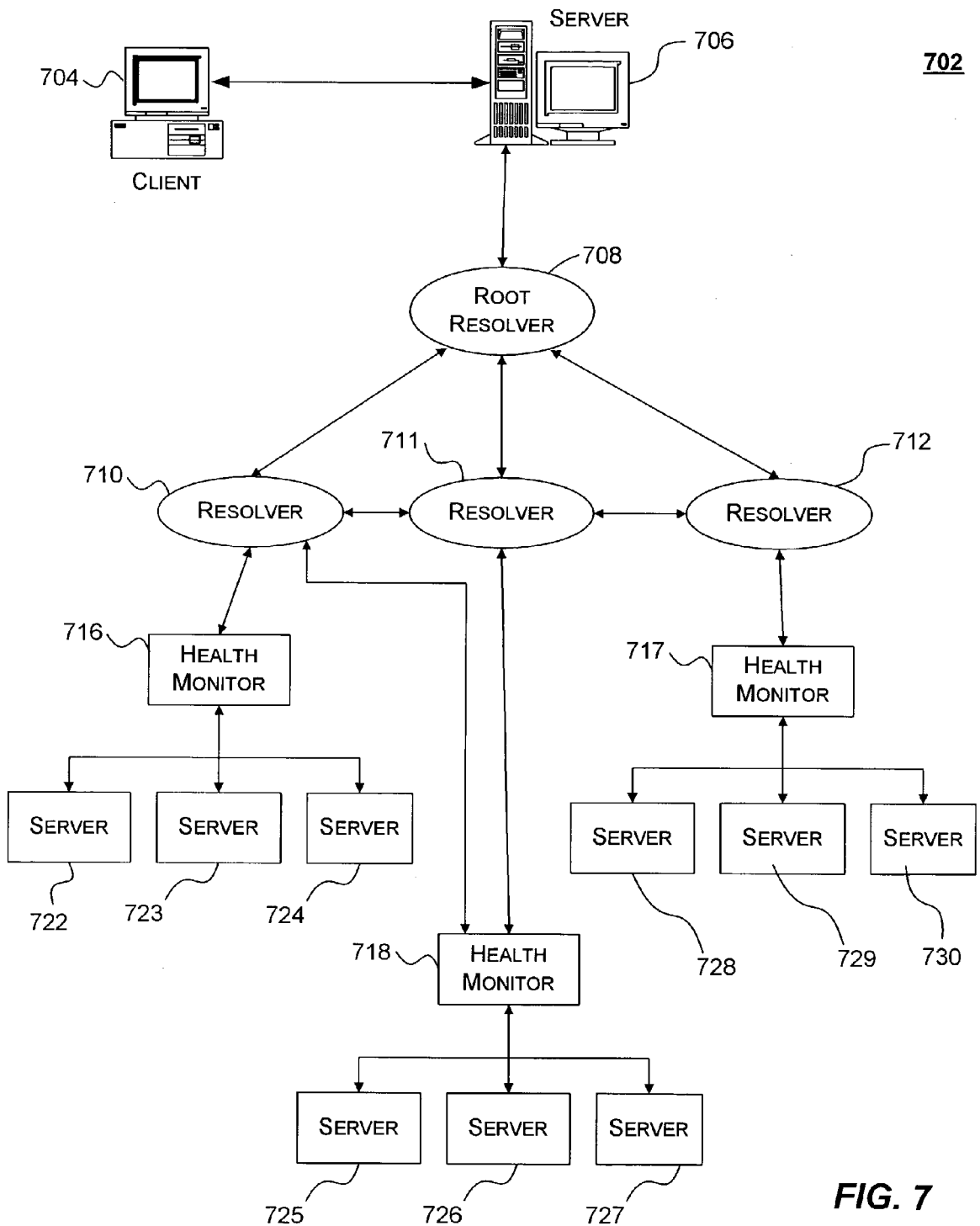
FIG. 7 is a block diagram representing an exemplary environment in which the invention may be practiced.

Returning scores corresponding to each service location allows the client and intermediary processes to further process the returned rankings of service locations. FIG. 7 illustrates an environment using multiple resolvers, where a root resolver uses results returned from other resolvers to produce combined results. In other variations, a client or an intermediate server can use the scores to combine results from multiple resolvers, to further limit the number of returned service locations evaluated, or to modify rankings based on policies not employed by the resolver.

FIG. 6 illustrates a process 602 of resolving a service request into a set of service locations, corresponding to the block 520 of FIG. 5. As illustrated in FIG. 6, the process 602 begins at a block 605. At block 610, a determination is made as to whether to resolve based on the client's address. If so, processing continues at block 615; otherwise, processing continues at block 620. Typically, the service location(s) will be resolved based at least partially on the client's address. Sometimes, however, other factors will be used to determine the appropriate service location(s) to return to the client. For example, a health of a service executing at a service location may be used exclusively to determine whether the service location should be returned to the client.

At block 615, data is accumulated regarding the client based on the client address. For example, geography information may be accumulated about a client based on the client's address. In addition, the client address may in some cases be used as a key to index a database including client preferences and a database including policies. After block 615, processing continues at block 620.

At block 620, a determination is made as to whether to resolve based on health of services running at service locations. If so, processing continues at block 625; otherwise, processing continues at block 630.

At block 625, health data is accumulated. As described previously, health data may include various statistics about a server upon which a service is executing. These statistics may include CPU utilization, memory usage, hard disk space available, processes active, bandwidth available, and usage to name a few. The health data may have been collected previously or may be collected in response to receiving a request. After block 625, processing continues at block 630.

At block 630, a determination is made as to whether to resolve based on client policy. If so, processing continues at block 635; otherwise, processing continues at block 640.

At block 635, policies that apply to the client are accumulated. For example, a resolver may access a policies database to determine which policies apply to the requesting client. For example, a policy may indicate that a client be sent service locations on servers with less than 20% CPU utilization. After block 635, processing continues at block 640.

At block 640, a determination is made as to whether to resolve based on other criteria. Other criteria may include client preferences and client characteristics. If so, processing continues at block 645; otherwise, processing continues at block 650.

At block 645, data based on other criteria is accumulated. Other criteria may include, for example, characteristics of the client, operating system, brand of computer on which the client is running, security clearance of the client, criteria sent by the client, a trace route of packets received by the client, or any other criteria. As described earlier, such characteristics may be sent by the client or looked up by the resolver upon receipt of a request. After block 645, processing continues at block 650.

The process returns at block 650.

FIG. 7 illustrates a configuration 702 of the invention employing multiple resolvers. The resolvers can be arranged in a hierarchical organization or in a non-hierarchical organization. In FIG. 7, a root resolver 708 communicates with resolvers 710-712. Client 704 communicates with root resolver 708 either directly or indirectly through an intermediate device, such as server 706. Aspects of the invention described with respect to FIG. 7 can be employed in conjunction with any of the configurations previously discussed. Though not shown in FIG. 7, UDDI registries, load balancers, traffic managers, and other entities can be employed as previously discussed.

The root resolver 708 receives a request for a service location from client 704. The root resolver transmits the request to each of the resolvers 710-712. The root resolver can also transmit, either with the request or separately, data that it has received or determined pertaining to characteristics of the client 704, health data, and policies.

In response to receiving the transmitted request and associated data, each of the resolvers 710-712 performs operations as previously described for configurations having a single resolver. Each resolver can use all or any portion of the data it received from the root resolver. A resolver can also retrieve or determine data independently. In the illustration of FIG. 7, each of the resolvers 710-712 communicates with one or more health monitors 716-718, and each of the health monitors receives health information pertaining to one or more of servers 722-730. Resolvers can share with each other data including data retrieved or determined independently. For example, resolver 710 can share health data obtained from health monitor 716 with resolver 711. Upon determining a list of service locations, each of the resolvers 710-712 transmits its corresponding list, along with scores corresponding to each list item, to the root resolver 708.

In response to receiving a list of service locations from each of the resolvers 710-712, the root resolver 708 combines the items from each list to produce a master list of service locations. The root resolver 708 may also produce its own list of service locations and combine this list with lists from other resolvers to produce the master list. The root resolver 708 then transmits the master list of service locations, along with corresponding scores for each list item, to the requesting client. It is understood that the requesting client may be server 706 acting as a client or client 704. It should also be understood that when transmitting the master list to client 704, that the master list may pass through server 706 or be transmitted directly to client 704.

The resolvers 710-712 can be logically configured in a number of ways with respect to the service locations which they provide to requesters. In one embodiment, each of the resolvers 710-712 is associated with a set of service locations that does not overlap with any set associated with any other of the other resolvers 710-712. In one embodiment, the sets of service locations associated with each resolver overlap. FIG. 7 illustrates resolvers 710 and 711 both communicating with the health monitor 718, which reports on health data of servers 725-727, while only resolver 712 communicates directly with health monitor 717, which reports health data of servers 728-730. Therefore, health data of servers 725-727 is directly received and processed by two resolvers. A resolver can include service locations in its processing even if it does not directly receive health data related to the servers. A resolver might receive health data for some servers from another resolver as mentioned earlier.

Also, in some configurations, a resolver can perform processing for servers without any health data pertaining to those servers.

The set of service locations associated with each resolver can be configured according to one or more of a number of criteria. In one configuration, a set of service locations is associated with a resolver using the physical location of the service locations as a criteria. In another configuration, a set of service locations is associated with a resolver using information that indicates the entities that control or own the service locations as criteria. A resolver can be configured to specialize in certain types of services or in services of a specified quality. Network domains and other factors can be used to assign service locations to resolvers. In one configuration, each of the resolvers 710-712 has the same associated set of service locations. For example, in some configurations, each of the resolvers 710-712 may be associated with and return service locations for services executing on servers 722-730.

Each of the resolvers 710-712 can use substantially similar algorithms or differing algorithms for determining scores of service locations. Each of the resolvers 710-712 can use identical factors or different factors for determining scores for service locations. For example, one resolver can be configured to use health factors and not use client characteristics, while a second resolver can be configured to use client characteristics and not use health factors.

The root resolver 708 can combine the lists of service locations it receives from each resolver by using the scores received from each resolver. In one embodiment, the scores are normalized, so that the combined list can be ranked based only on the received scores. In another embodiment, scores received by each resolver are multiplied by a weighting factor corresponding to the resolver. When a service location is common to more than one list, the scores can be averaged or added to obtain a final score, or manipulated in other ways.

The use of multiple resolvers can increase the overall capacity of the system. The use of multiple resolvers can also increase the availability of the system as well as the freshness of data, such as health data. Having one or more resolvers that specialize in certain factors can increase the accuracy of the system and allow the one or more resolvers to be more finely tuned to those factors.

Figure 8:
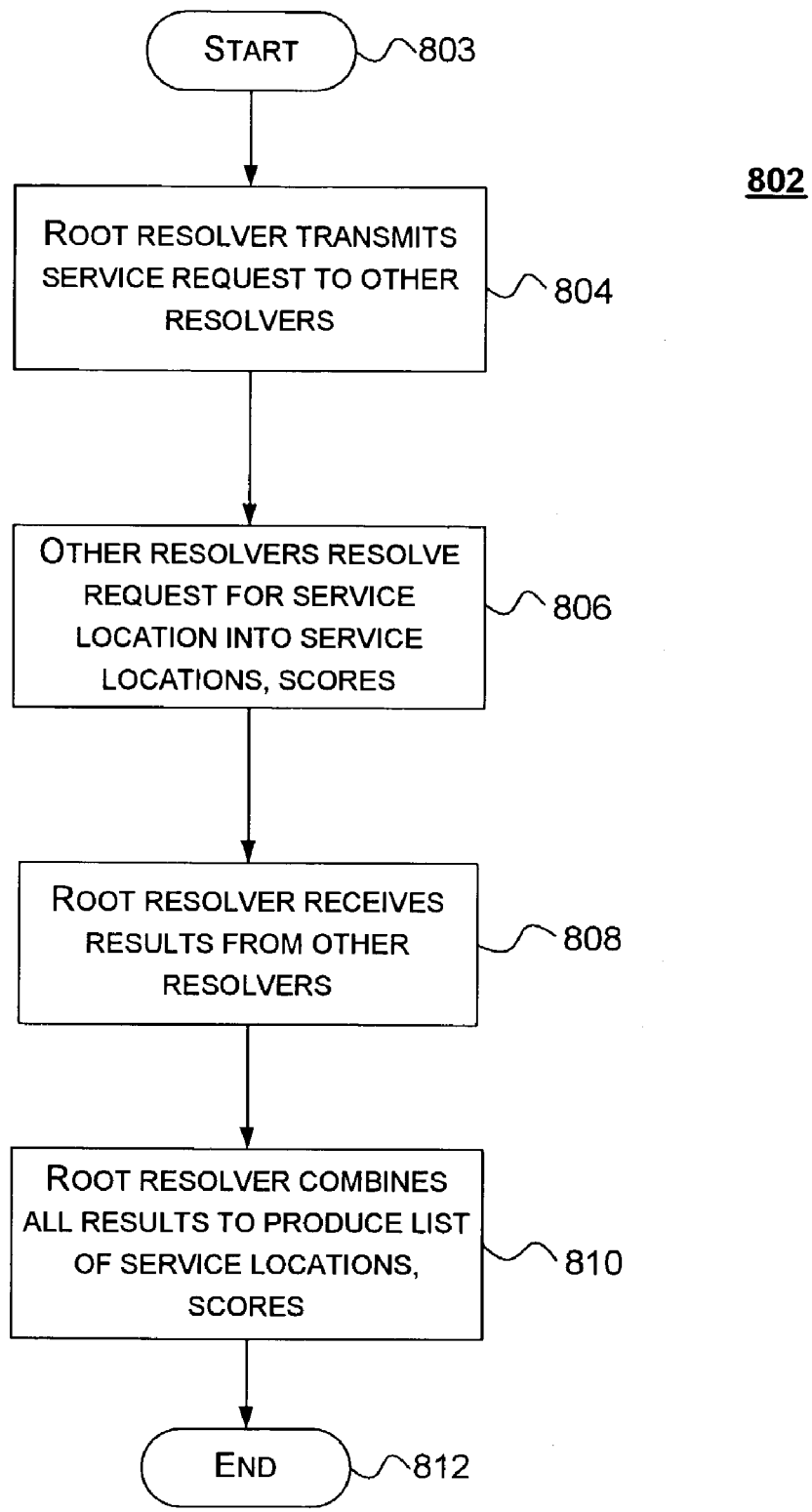
FIG. 8 is a flow diagram illustrating an exemplary process in which a request for an address of a service is mapped to one or more service locations.

FIG. 8 illustrates a process 802 for matching a request for a service location with one or more service locations when using more than one resolver. In one embodiment, process 802 is performed as actions within block 520 of FIG. 5. As illustrated in FIG. 8, the process begins at block 803. At block 804, a resolver, such as root resolver 708 of FIG. 7, transmits a received service request to one or more other resolvers, such as resolvers 710-712 of FIG. 7. At block 806, the other resolvers receive and process the request into a set of service locations and corresponding scores. Each of the other resolvers transmits its set of service locations and scores to the root resolver.

At block 808, the root resolver receives, from zero or more other resolvers, a set of service locations and scores. At block 810, the root resolver combines all of the results optionally with a set of service locations independently determined by the root resolver and produces a combined list of service locations or scores. At block 812, the process ends. Process 802 may be performed each time multiple resolvers are used to resolve a request for a service location into one or more service locations.

In one embodiment, the returned scores corresponding to each service location include component scores, such as a score for each criteria employed. This allows intermediate resolvers, servers, or the client to further manipulate scores. For example, a root resolver might have more accurate data corresponding to a specific criteria, and use this to replace the corresponding portion of the score calculation received from another resolver. In an other application, a client might desire to not disclose certain criteria policies or data it considers confidential. The client can perform additional calculations on the received scores based on these polices or data. In one configuration, a client might employ a private root resolver, and transmit confidential information to the private root resolver. When the private root resolver invokes one or more other resolvers, the confidential information can be withheld. The root resolver can then post-process results returned from the other resolver based on the confidential information it has available. Similarly, a client or a private root resolver might desire specific enhanced processing that is not supported by the general resolvers. Including component scores provides additional capability to post-process returned scores, for use by the client.

The use of scores is not limited to scores passed between resolvers in a hierarchy or otherwise. Scores may be passed to other intermediate devices that may use the scores to perform additional processing. Scores may also be passed to a requester. In one embodiment of the invention, a server, such as UDDI server 205 of FIG. 2 uses scores returned by resolver 210 to make additional determinations as to which service locations should be returned to client 225. In another embodiment of the invention, scores are passed to client 225.

Embodiments of the invention may use a synchronous messaging system or an asynchronous messaging system to communicate a request for a list of service locations corresponding to a service and a response to the request. A synchronous messaging system is one in which a request and a response to the request are sent during a single communication session. Some exemplary synchronous messaging systems include Common Object Request Broker Architecture (CORBA), HyperText Transport Protocol (HTTP), Distributed Component Object Model (DCOM), eXtensible Markup Language-Remote Procedure Call (XML-RPC), Java® Remote Method Invocation (RMI), and the like. An asynchronous messaging system is one in which a request and a response to the request are not sent during a single communication session. Some exemplary asynchronous messaging systems include SMTP and Post Office Protocol (POP). It will be understood, however, that any messaging system that allows communication of a request or response may be used without departing from the spirit or scope of the present invention.

The above specification, examples, and data provide a complete description of the manufacture and use of the composition of the invention. Since many embodiments of the invention can be made without departing from the spirit or scope of the invention, the invention resides in the claims hereinafter appended.

What is claimed is:

1. A system for mapping a request to a service comprising:
   a plurality of resolvers including a root resolver and a secondary resolver, each resolver arranged to perform actions comprising determining a set of service locations based at least in part on the service and an address associated with a client;
   wherein the root resolver is further arranged to combine sets of said determined service locations and return a combined set of service locations to the client; and wherein at least one resolver of the plurality of resolvers employs an algorithm that is different from an algorithm employed by another resolver of the plurality of resolvers, wherein each algorithm is employed to determine scores of service locations, wherein said combined set of service locations comprises said scores of service locations.

2. The system of claim 1, wherein each of the resolvers is associated with a set of service locations that do not overlap with any set of service locations associated with another resolver.

3. The system of claim 1, wherein each of the resolvers is associated with a set of service locations and wherein at least some of the sets of service locations overlap.

4. The system of claim 1, wherein the root resolver is further arranged to determine scores for each service location in the combined set of service locations.

5. The system of claim 4, wherein the root resolver is further arranged to return the scores together with the combined set to a client.

6. The system of claim 1, wherein the plurality of resolvers are arranged in a hierarchy.

7. The system of claim 1, wherein a resolver other than the root resolver obtains information from another resolver.

8. The system of claim 1, wherein at least one of the resolvers in the plurality of resolvers specialize in certain types of services.

9. The system of claim 1, wherein each resolver employs a substantially similar algorithm to determine scores of service locations.

* * * * *